(No Model.) 2 Sheets—Sheet 2.

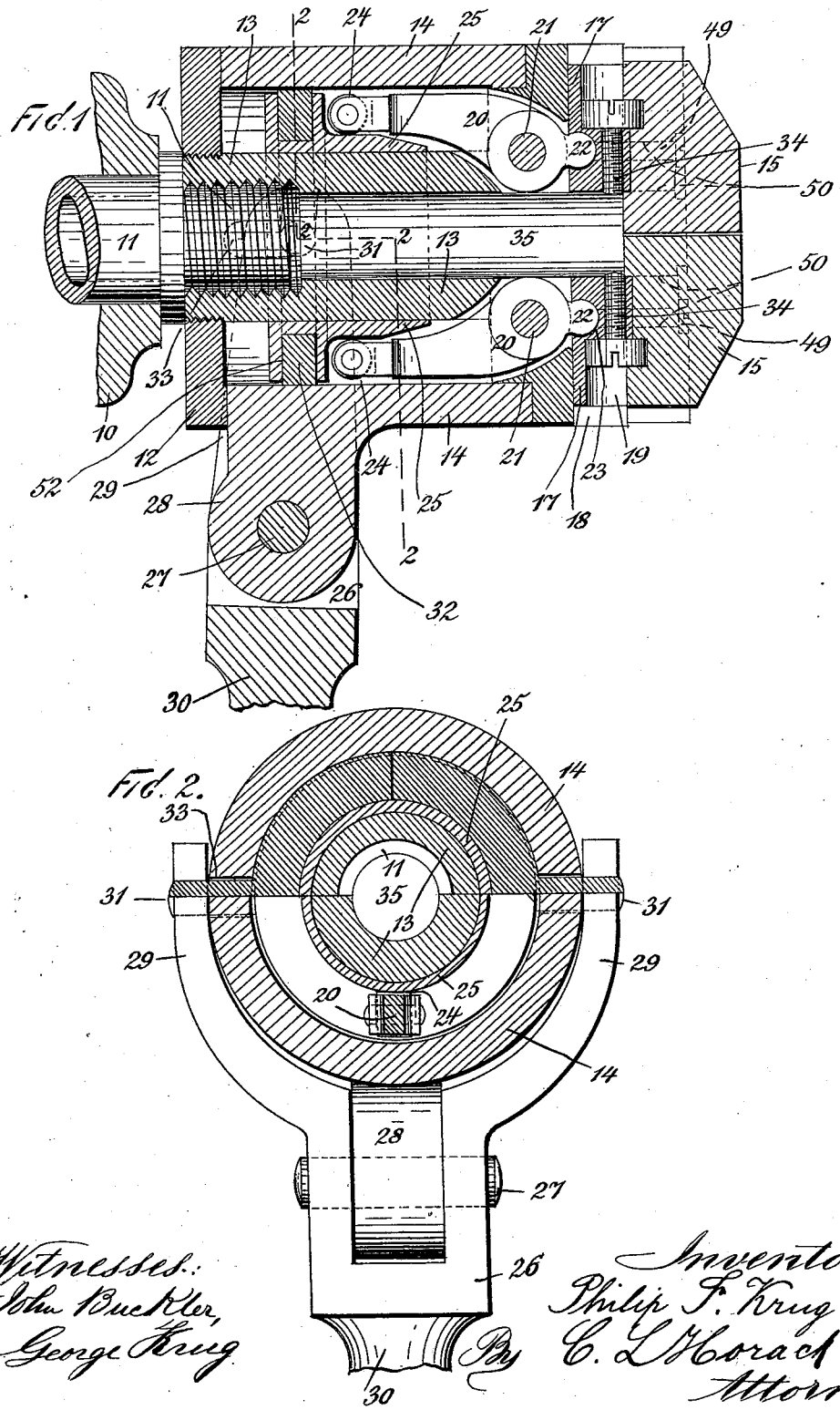

P. F. KRUG.
CHUCK.

No. 547,644. Patented Oct. 8, 1895.

Witnesses:
John Buckler,
George Krug

Inventor
Philip F. Krug
By C. L. Horack
Attorney.

ANDREW B.GRAHAM, PHOTO-LITHO. WASHINGTON, D.C.

UNITED STATES PATENT OFFICE.

PHILIP F. KRUG, OF NEW YORK, N. Y.

CHUCK.

SPECIFICATION forming part of Letters Patent No. 547,644, dated October 8, 1895.

Application filed July 9, 1894. Serial No. 516,893. (No model.)

*To all whom it may concern:*

Be it known that I, PHILIP F. KRUG, a citizen of the United States, and a resident of the city of New York, county and State of New York, have invented certain new and useful Improvements in Chucks, of which the following is a specification.

My invention relates particularly to chucks such as are used in combination with turning-lathes, and are known as "universal" and "eccentric chucks;" but it will be seen from the following specification that some of the features of my invention are also applicable to ordinary stationary gripping-vises and all kinds of chucks.

The purposes of my invention are to so construct a chuck as to permit of opening and closing the same without the use of wrenches or tools, and while the lathe with which it is connected may be revolving.

Further purposes are to provide simple and efficient means for producing a strong, uniform, and prompt gripping action by the jaws of the chuck, to permit such chuck to operate with very little friction and to suitably protect the portions of the chuck which are in operative engagement with its jaws, and to guard against slack and wear of the jaws and to compensate for the same. I accomplish these and other useful purposes in the manner and by the means hereinafter described, and set forth more particularly in the claims.

Figure 3:
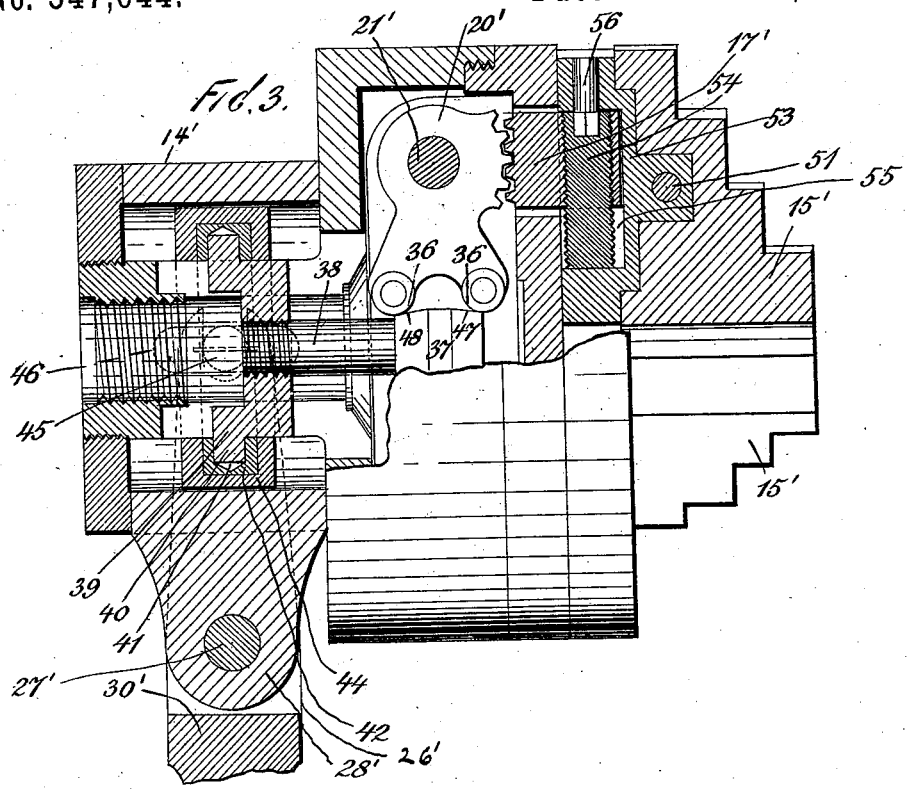

In the accompanying drawings, forming part of this specification, and wherein like figures of reference refer to corresponding parts, Figure 1 represents a vertical longitudinal section of a chuck comprising the leading features of my invention, the same being in a closed condition, and Fig. 2 a vertical cross-section along lines 2 2 in Fig. 1. Fig. 3 shows another chuck, principally in longitudinal vertical section, comprising all the leading features of my invention; and Fig. 4 an end view thereof.

In the device a part of the body of the chuck is made stationary and is provided with lugs for receiving an operating-lever, and it will therefore be seen that by attaching such stationary part to a suitable support, such as a bench, this chuck may be employed as a vise.

Referring first to Figs. 1 and 2, 10 10 is part of the stationary lathe-frame contiguous to the chuck. 11 is the driving-spindle revolving therein. 12 is the rear end plate of the chuck-body. The same is connected by screw-thread to revolving casing 13, which for nearly its entire length is surrounded by the stationary part 14 of the body of the chuck. 15 15 are jaws adjusted in the usual manner to slide in proper guides along the front face of the chuck in radial directions. 17 represents blocks to which the jaws are attached by screws 49. These blocks are adjusted to slide within guiding-slots 18 in plate 19, which forms part of the front portion of the chuck-body. 20 20 are levers with their fulcrums 21 attached to casing 13. 22 are rounding projections at the front ends of said cam-pieces and entering proper sockets 23 in sliding blocks 17. The rear projections of said levers are made forking at their extreme ends and provided with friction-rollers 24, capable of engaging with and revolving along the outer front surfaces of an annular device 25, which is adjusted to slide along the rear cylindrical surface on the shank portion of casing 13. 26 is a lever fulcrumed at 27 to lug 28, extending downward from the stationary part 14 of the chuck-head. The upper end of said lever is provided with two arms 29 29, made forking, so as to extend around the lower half of such stationary part, and its lower portion 30 serves as a handle for operating said lever. 31 31 are horizontal pins passing through the outer ends of the branches of such fork inwardly through part 14, they being integral with the portions of a sectional ring 32 inserted into an annular outer space 52 on sleeve 25, and it will be seen that by throwing the handle of lever 26 to the right pins 31 will compel the movement to the left of sleeve 25, whereby the end rollers 24 of the levers 20 will be permitted to move along the forward sloping outer surfaces of sleeve 25, the jaws of the chuck being thereby allowed to open. On the other hand, in case the chuck be open and the operator desires to close the same, the handle of the lever will have to be thrown to the left. This will force sleeve 25 to the right, and will thereby guide rollers 24 along its sloping surfaces into the positions shown in Fig. 1, thereby closing the chuck.

33 is a slot within outer casing 14, within which pins 31 move. The binding action between rollers 24 and the outer surfaces of sleeve 25 will keep the chuck closed. 34 represents screws passing in radial directions through blocks 17, and having their heads inserted in proper recesses in jaws 15, so as to permit relative displacement of the blocks and jaws by turning the screws. This is done to provide for taking up any slack in the movement of the jaws on account of wearing, and also to permit of using the chuck eccentrically if desired. 35 is a cylindrical recess within revolving casing 13, into which the extreme end of the article which is to be milled in the chuck may be inserted before the gripping action of the jaws is exerted upon such article.

Figure 4:
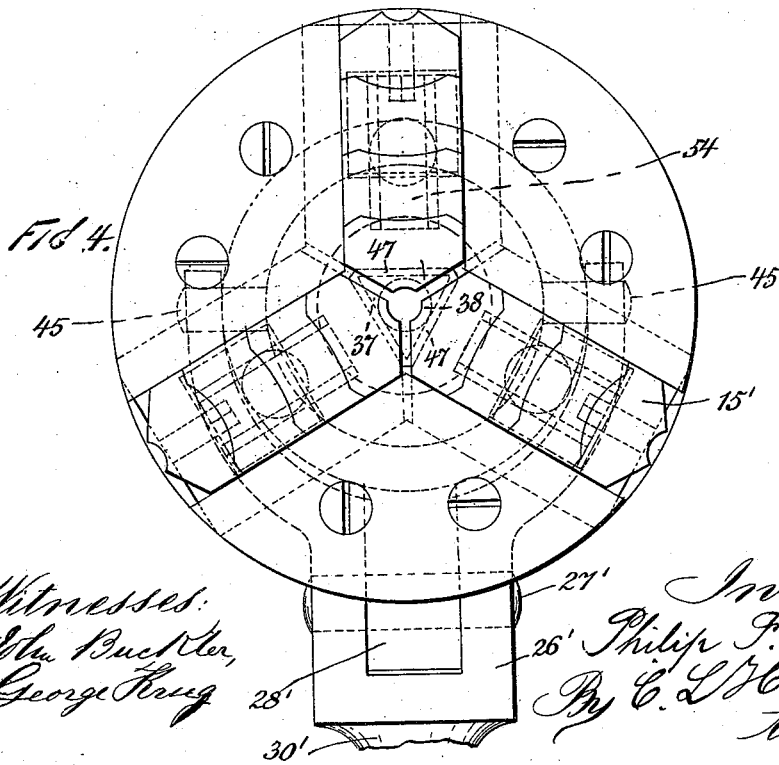

The device shown in Figs. 3 and 4 differs from the one last described, owing to the introduction therein of several useful details. In this device the rear surfaces of blocks 17' are constructed as racks engaging with teeth on the corresponding projections on levers 20'. In this construction three chuck-jaws, and hence three levers for operating the same, are provided. The interior parts of said levers are each divided into two branches, each such branch being provided with a roller 36. One of such rollers on each lever engages in front and the other in the rear with a thickened part 37 of triangular cross-section provided on longitudinally-sliding rod 38. The movement of said rod is caused by movement of lever-handle 30', through the instrumentality of block 39 and intermediate parts, said block being firmly attached to rod 38 and provided with pins 40, fitting into suitable recesses 41 in sectional ring 42, which latter is let into an annular recess in another sectional ring 44, forming a shoe, which surrounds ring 42 and bears on and is adjusted to slide along the inner surfaces of the stationary parts 14' of the chuck-body. Block 39 and ring 42 form substantially one body revolving with rod 38 within sliding ring 44. 45 represents pins extending through the upper arms of lever 26' and longitudinal slot 46 in casing 14' and are made integral with the sections forming ring 44, for the purpose of producing through the same longitudinal movement of rod 38, and thereby opening and closing of the chuck by means of lever 26'. 47 and 48 are slopes on the thickened part 37 of rod 38. Owing to the binding action of rollers 36 upon such sloping surfaces, the chuck will be held in closed position, and the jaws, owing to the fact that such slopes run in opposite directions with reference to the axis of sliding rod 38, can be actuated positively in both directions by corresponding movements of said rod.

In the device illustrated in Figs. 1 and 2, jaws 15 are held in contact with blocks 17 before and after relative displacement of said jaws and blocks is effected by screws 49 passing through suitable slots 50 into such blocks 17. While such displacement is being accomplished, such screws must be loosened sufficiently so as to release them from engagement with any part of the jaws.

In the chuck illustrated in Figs. 3 and 4 the jaws 15' are of the reversible type and are secured by pins or screws 51 to frames 53, which latter receive within recesses 55 the forward parts of blocks 17' and the screws 54 passing through such forward parts and having both their ends firmly seated on the walls of such recesses. The outer surfaces of said jaws being constructed with offsets, as shown, said offsets, when the jaws occupy the positions illustrated in Figs. 3 and 4, may be made to engage with the interior surfaces of tubes or hollow articles of various interior diameters or dimensions, it being only necessary to give to levers 20' sufficient play to cover the greatest diametrical difference between two successive offsets, and in that case slope 47, binding with its corresponding friction-roller 36, will secure firm engagement of the jaws with such articles, while if the outer surfaces of an article be clamped between the jaws, whether in their positions as illustrated or in their reversed positions, slope 48, in combination with its corresponding friction-roller, will perform an analogous function. 56 is a channel within a frame 53, through which a key may be inserted for turning screw 54, and it will readily be seen that as block 17' acts as a nut for screw 54, and as the position of such screw is fixed with reference to frame 53 and the chuck-jaw attached thereto the turning of such a key while in engagement with the screw will cause the relative displacement of the jaws and the sliding blocks 17' normally controlling their movements. Jaws 15' or frames 53 may be secured to blocks 17' after such adjustment has been made in a manner corresponding with that described above with reference to the device illustrated in Figs. 1 and 2.

It will readily be seen that my invention does not limit me to any particular number of chuck-jaws, and that the details of the devices described herein might be changed materially without departing from the spirit of my invention.

Having claimed in another application, Serial No. 516,892, bearing even date herewith, certain features illustrated and described, but not claimed herein, I hereby disclaim, as far as this application is concerned, what is so claimed elsewhere.

I claim as new and desire to secure by Letters Patent—

1. In a chuck, in combination with its casing, sliding jaws, pivoted levers for actuating the same, and a block, as 37, adjusted to slide along said casing and provided with suitable wedging surfaces inclined in opposite directions with reference to the axis of such block, substantially as set forth.

2. In a chuck, in combination with its casing, sliding jaws, pivoted levers for actuating the same, a block, as 37, provided with suitable wedging surfaces inclined in opposite directions, and friction rollers interposed between the levers and the wedging surfaces, substantially as set forth.

3. In a chuck, in combination with its casing, sliding jaws with inner and outer bearing surfaces, pivoted levers having arms actuating said jaws, and having other arms provided each with two independent engaging surfaces, and means for alternately confining these engaging surfaces in operative contact with their actuating device, for the purpose of alternately applying the outer and the inner bearing surfaces of the jaws to the articles which are to be held in the chuck, substantially as set forth.

4. In a chuck, the combination of a sliding jaw, a lever 20', sliding and revolving block 37, 38, 39 provided with proper surfaces adapted to engage with said lever, shoe 44 in engagement with said block, and means for moving said shoe forward and rearward, substantially as set forth.

5. In a chuck, the combination of a sliding jaw, a lever 20', sliding and revolving block 37, 38, 39 provided with proper surfaces adapted to engage with said lever, shoe 44, ring 42 and lever 30', substantially as set forth.

In testimony that I claim the foregoing as my invention I have signed my name, in presence of two witnesses, this 3d day of July, 1894.

PHILIP F. KRUG.

Witnesses:
CHAS. L. HORACK,
JOHN C. GULICK.